United States Patent [19]

Wilson

[11] 4,295,191

[45] Oct. 13, 1981

[54] PROGRAMMABLE CONTROL SYSTEM

[75] Inventor: Worley C. Wilson, Ft. Lauderdale, Fla.

[73] Assignee: Telemetry Controls, Inc., Miami, Fla.

[21] Appl. No.: 121,446

[22] Filed: Feb. 14, 1980

[51] Int. Cl.³ .................... G05B 19/04; H01H 43/00
[52] U.S. Cl. .................................. 364/104; 307/141.4; 340/309.4
[58] Field of Search ............... 364/104; 307/41, 141.4, 307/141, 141.8; 239/66, 69, 70; 340/309.1, 309.4, 309.5, 147 P; 200/38 R, 38 D, 37 R, 17 R

[56] References Cited

U.S. PATENT DOCUMENTS

| | | | |
|---|---|---|---|
| 3,400,891 | 9/1968 | Mattwell | 239/69 X |
| 3,440,434 | 4/1969 | Yates et al. | 307/41 |
| 3,599,867 | 8/1971 | Griswold et al. | 239/70 X |
| 3,603,961 | 9/1971 | Duris et al. | 340/309.4 |
| 3,684,358 | 8/1972 | Boudouris et al. | 340/309.1 X |
| 3,824,435 | 7/1974 | Sebille et al. | 340/147 P X |
| 3,863,079 | 1/1975 | Calabrese | 307/41 |
| 3,869,854 | 3/1975 | Church | 239/70 |
| 3,903,515 | 9/1975 | Haydon et al. | 340/309.4 |
| 3,905,020 | 9/1975 | Knox | 340/147 P |
| 3,987,430 | 10/1976 | Saarem et al. | 340/309.1 |

Primary Examiner—Joseph F. Ruggiero
Attorney, Agent, or Firm—Morgan, Finnegan, Pine, Foley & Lee

[57] ABSTRACT

A programmable multi-channel automatic control system is disclosed. A user-accessible front panel is programmed by the insertion of program pins into program time slots that correspond to one hour increments of a 24 hour day. Two detent positions of the program slot enable the user to select two distinct on/off schedules for each of the individual program channels. Seven-day program slots for each individual program channel are provided to allow selected equipment to operate on alternate schedules and/or to remain on or off for complete 24 hour periods.

6 Claims, 4 Drawing Figures

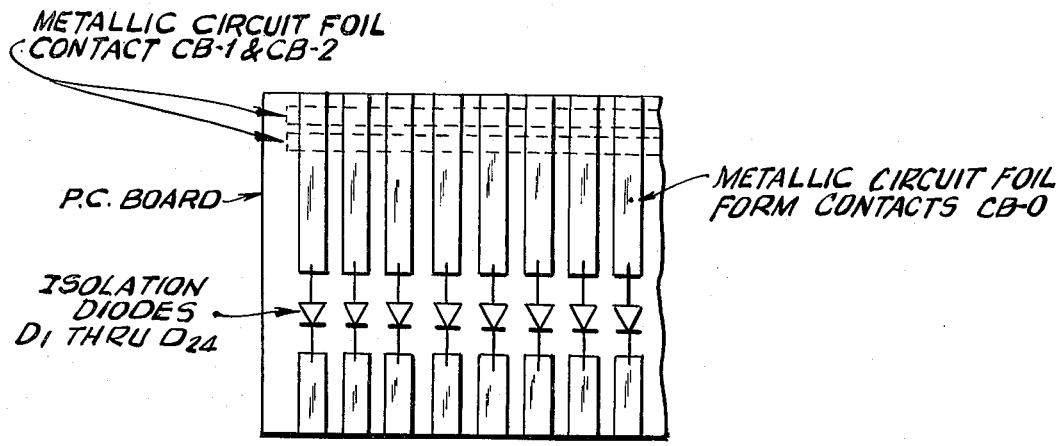
FIG. 2
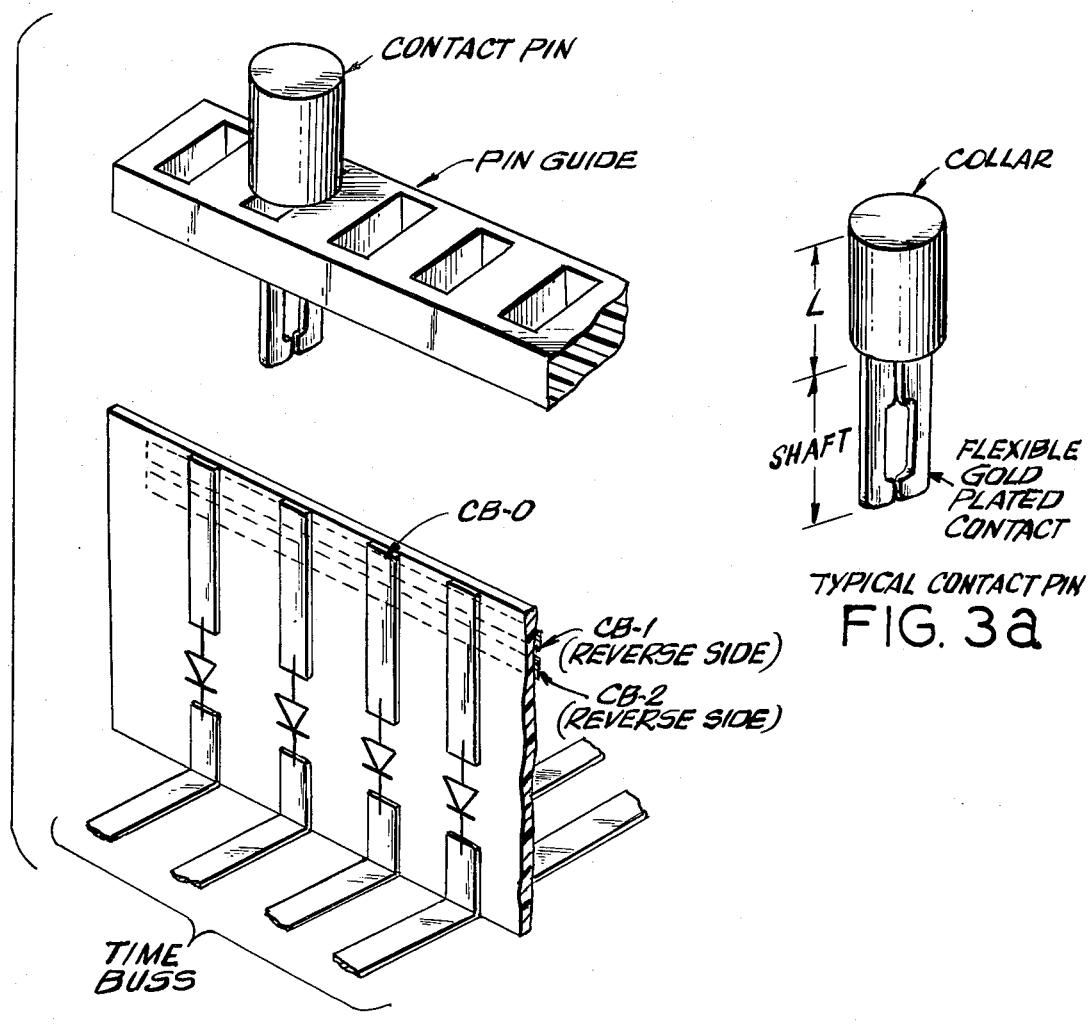
FIG. 3a
FIG. 3b

PROGRAMMABLE CONTROL SYSTEM

BACKGROUND OF THE INVENTION

This invention relates to the field of automatic control systems, and more particularly to an electronic programmable multi-channel automatic control system having useful application in the field of energy management, irrigation, laboratory control systems, process control and other areas where time based control actions may be initiated automatically.

Conventional automatic control systems have several known limitations. At one end of the spectrum, the existing electro-mechanical control systems tend to suffer from many of the problems normally associated with systems which use moving mechanical components, i.e., the reliability and operational accuracy experienced in practice are less than optimum. At the other end of the spectrum, the sophisticated fully automated software-controlled systems tend to be costly and often require extensive programming skills for their utilization.

In view of the present concern with energy conservation, the above limitations associated with conventional automatic control systems used for energy management may be undesirable in many applications.

An optimal energy management control system for use in an industrial, commercial or residential environment should be capable of providing accurate and reliable operation. To maximize operating life, to minimize mean time between failure, and to optimize reliability and ruggedness, the control system should preferably have no or few moving parts. From the point of view of the user, the control system should be easy to program and should be capable of displaying the programmed parameters to allow the user to readily verify the program and, if necessary, to modify the program. Furthermore, the control system should be cost effective.

It is accordingly a general object of the present invention to provide an automatic control system which is not accompanied by the limitations and drawbacks associated with the known systems, and which has attributes more nearly approaching those of the optimal system.

It is a particular object of the invention to provide an improved simple, low-cost automatic control system capable of being easily used to control energy usage.

Other objects will be apparent in the following description of the preferred embodiment and the practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as an electronic programmable control system comprising: time base generating means including means for providing a plurality of output timing signals corresponding to a plurality of discrete points of a predetermined time base; controllable data transfer means; programmable connection means including a plurality of controllable circuit paths operatively connected between said time base generating means and said controllable data transfer means, said programmable connection means including user-accessible panel means for receiving insertable program pins which effect actuation of selected ones of said controllable circuit paths thereby coupling selected ones of said output timing signals to said controllable data transfer means; data transfer control means for selectively enabling said controllable data transfer means; and programmable switching means operatively connected to said controllable data transfer means and responsive to said transferred output timing signals for generating a switching control signal.

BRIEF DESCRIPTION OF THE DRAWINGS

Serving to illustrate an exemplary embodiment of the invention are the drawings of which:

FIG. 2 illustrates the utilization of isolation diodes when multiple channels are employed; and FIGS. 3a, b illustrates the use of insertable contact pins to program the control system of the present invention.

DETAILED DESCRIPTION OF PREFERRED EMBODIMENT

Figure 1:
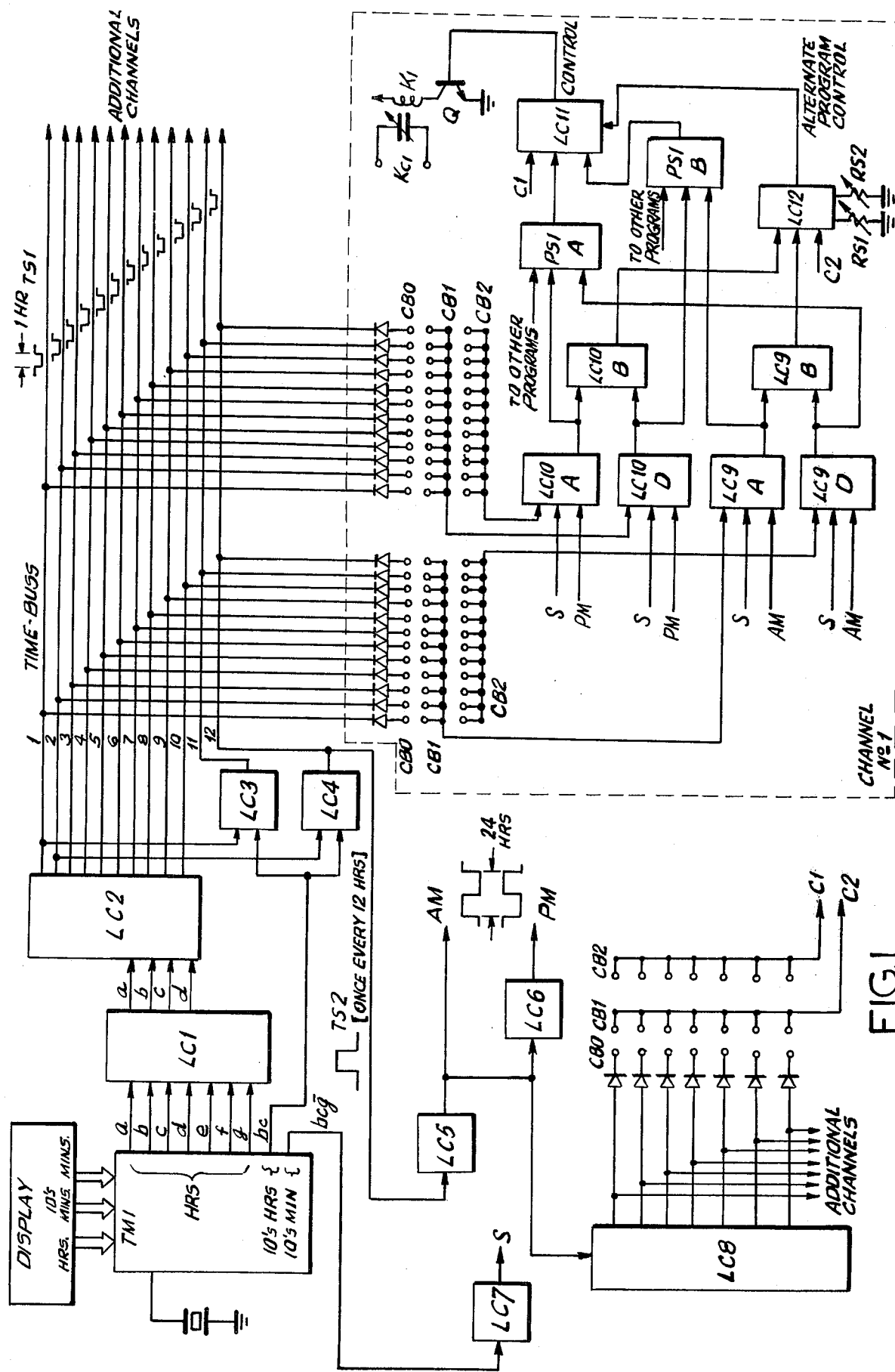
FIG. 1 is a block diagram of one channel of the multi-channel control system, in accordance with the present invention.

Referring to FIG. 1, a block diagram of one channel of a programmable multi-channel automatic control system, in accordance with the present invention, is illustrated. As shown therein, a time base module TM1, consisting of a crystal-controlled oscillator and associated counter and logic control circuitry, provides a digital output composed of seven data lines. The seven lines of decoded output (a-g) from the TM1 module correspond to the discrete time increments of minutes, tens of minutes, hours, and tens of hours. When the decoded output lines are connected to a seven-segment numerical display a visual representation of the decoded information is obtained.

The seven bits of data from the "hours" increments and the two bits of data from the "tens of hours" increments are decoded to provide a corresponding decimal output of the twelve incremental hours of the TM1 time base. The "hours" data lines are first encoded by the 7-line to 4-line binary coded decimal (BCD) converter module LC1 to provide a 4-line BDC representation of the 7-bits of data input. The 4-lines of BCD data output (a-d) from LC1 are then decoded by logic control circuit LC2 to provide a 10-line decimal output. Logic control circuits LC3 and LC4 provide decoding of the eleventh and twelfth hour increments of the time base. The twelve-decimal outputs from LC2, LC3 and LC4 are used to form a 12-bit data buss corresponding to 12 discrete steps occurring at 1 hour increments.

Diodes $D_1$ through $D_{24}$ attached to the time buss lines illustrated in FIG. 1 perform the function of isolating the interaction of logic levels when additional program channels are added to the time buss data lines. The anode ends of diodes $D_1$ through $D_{24}$ are attached to the printed circuit board "finger strips", illustrated in FIG. 2, to form one pole of a switch contact. The other poles of the switch are formed by the printed circuit "strips" on the opposite side of the circuit board and are shown as CB-1 and CB-2 in FIGS. 1 and 2.

Referring now to FIGS. 3a, b, an insertable contact pin which electrically connects pole CB-0 to pole CB-1 or CB-2 or both simultaneously as determined by the insertion depth or collar length (L) of the contact pin is illustrated. A pin guide consisting of small rectangular holes aid in aligning the pin to effectively mate with the corresponding poles of the circuit board. With the pin having a long collar, pole CB-0 will be contacted to pole CB-1. A medium collar pin will connect pole CB-0 to pole CB-1 and CB-2 simultaneously. A short collar pin will connect pole CB-0 to CB-2 only. A short collar indicates a long pin shaft while a long collar indicates a short pin shaft.

Referring again to FIG. 1, when one or more contact pins are inserted to effect a contact closure at a corresponding time increment, a voltage level change on the appropriate time buss line is coupled to control logic circuits LC9 and LC10. LC9 receives data inputs from the first twelve pin positions and LC10 receives data inputs from the second twelve pin positions. The first 12 slots are for the AM portion of the 24 hour format; the second 12 slots are for the PM portion. Control logic circuits LC5 and LC6 automatically inhibit and enable the respective LC9 and LC10 circuits. Control logic circuit LC5 consists of a triggered flip-flop having two stable states. Every twelve hours logic circuit LC4 produces an output pulse (TS-2). This pulse alternately toggles control logic circuit LC5 so that both a high and low output voltage level occur during the 24 hour period. LC6 inverts this output so that when the PM portion of the 24 hour format is occurring, all data outputs from LC9 are inhibited while those from LC10 are enabled, and alternately, all data outputs from LC10 are inhibited while those from LC9 are enabled when the AM portion of the time format is occurring. This prevents interaction of the AM and PM selected time signals from the time buss, so that an AM selected signal will not also be activated at the same time period during the PM segment, and PM selected time signals will not be activated during the AM segment.

Although the time buss selected signal and the appropriate AM or PM signal may be present at the input to control logic circuit LC9 or LC10, the corresponding data output signal DO-1 or DO-2 will not occur in the absence of a strobe pulse produced by control circuit LC7. This pulse occurs at each hour on the hour and provides the data transfer at the LC9 and LC10 inputs only at that time. It is noted that this enhances the noise immunity of LC9 and LC10 to insure that only valid selected time signals are outputted. The data outputs from LC9 and LC10 are connected to a bank of miniature program switches PS-1 which allow for various circuit alternatives when other data channels are included in the system. For example, they might allow signals from data channel 1 to be switched in such a manner that control circuit LC11 can be controlled from time-selected signals from data channel 2 or 3, etc.

The output signals from the program select switches PS-1 are routed to control logic circuits LC11 and LC12. LC11 comprises an R-S type flip-flop having two stable states. To effect an ON state of the LC11 flip-flop, a short shank pin connecting CB-0 to CB-1 should be used in the appropriate "time select slot" required for the ON function. When an OFF function is required, a long shank pin is used to connect CB-0 to CB-2. When a medium shank pin is used to connect CB-0 to CB-1 and CB-2, control logic circuit LC12 receives a control input. In this particular application, logic circuit LC12 consists of an interval timer that has an adjustable ON time controlled by RS-1 and an adjustable OFF time controlled by RS-2. The action of the interval timer allows periodic OFF control of the load connected to relay terminals (KC1).

The first input pulse derived by the CB-0 to CB-1 and CB-2 contact closure will enable the LC12 interval timer to begin cycling provided LC11 has previously been activated to the LOAD/ON state. This cycling function causes relay K1 to de-energize to the OFF state for a period determined by RS-2. The ON period of the KC1 relay contacts is determined by RS-1. Data pulse signals from logic circuit LC11 are amplified by transistor Q1 to drive the relay circuit K1.

Control logic circuit LC8 comprises an 8 stage Johnson Counter that is incremented one stage every 24 hours. The positive transition of the 12 hour AM-PM control signal occurs every 24 hours at the output of logic circuit LC5. These positive input pulses to LC8 cause the Johnson Counter to advance one step each 24 hour period. The 7-line outputs from LC8 form the 7 day clock buss. Diodes $D_{25}$ through $D_{31}$ provide logic level isolation between adjacent data channels which may be added to the 7 day clock buss line. The counter arrangement for the 7 day clock buss line is identical to the main time-buss contact configuration illustrated in FIGS. 2, 3a, and 3b.

Data levels from LC8 appearing at contact CB-1 as a result of insertion of the contact pin are input through the program select switches PS-1 to logic circuit LC11. A signal appearing at the LC11 input from the 7 day clock line will inhibit any ON or OFF signal from activating relay K1 during the 24 hour period corresponding to the particular day(s) of the week selected by insertion of the pin. The inhibit period will be in effect from 12 AM of one day to 12 AM of the following day for each inserted contact pin.

Control logic circuit LC12 is not normally affected by inhibit signals from the 7 day clock line but program switch PS-1 allows for connected the LC12 circuit to the 7 day clock line. This connection is made in an inverted manner, i.e., when the LC11 circuitry is disabled from controlling relay K1 the LC12 circuitry is enabled to provide an on-off control through contact selection of CB-0 to CB-1 and CB-2 (medium shank pin) and inversely, the LC12 circuitry will be inhibited after the 7 day clock signal allows LC11 to be enabled. This alternate feature allows for a load to be turned on and off for certain days of the week at selected time periods utilizing the CB-0 to CB-1 or CB-2 on-off contacts, and on-off functions that may require different time on-off periods for one or more different days of the 7 day period utilizing the CB-0 to CB-1 and CB-2 contacts.

The above description of the preferred embodiment is exemplary and should not be considered as limiting the scope of the present invention which is defined by the following claims.

What is claimed is:

1. An electronic programmable system for controlling the operation of remotely located equipment comprising:
   (a) time base generating means including means for cyclically providing a plurality of output timing signals corresponding to a predetermined number of equally spaced-apart points of a preselected time base;
   (b) controllable data transfer means including first data transfer means and second data transfer means;
   (c) programmable connection means including a plurality of controllable circuit paths operatively connected between said time base generating means and said first data transfer means and a plurality of controllable circuit paths operatively connected between said time base generating means and said second data transfer means, said programmable connection means including user-accessible panel means for receiving insertable program pins which effect actuation of selected ones of said controllable circuit paths thereby coupling selected ones of said output timing signals to said first data transfer means and to said second data transfer means;

(d) data transfer control means for selectively enabling said controllable data transfer means, said data transfer control means including means for generating a first data transfer control signal, a second data transfer control signal and a strobe signal, wherein said first data transfer control signal is coupled to said first data transfer means and said second data transfer control signal is coupled to said second data transfer means and said strobe signal is coupled to said first and second data transfer means, said first data transfer means being enabled when said first data transfer control signal, said strobe signal and one of said coupled output timing signals are coincidently applied to said first data transfer means, said second data transfer means being enabled when said second data transfer control signal, said strobe signal and one of said coupled output signals are coincidently applied to said second data transfer means; and (e) programmable switching means operatively connected to said controllable data transfer means and responsive to said transferred output timing signals including means for generating a switching control signal for controlling the operation of said remotely located equipment.

2. An electronic programmable control system as recited in claim 1 including electronic display means responsive to said time base generating means for providing a visual display of said time base.

3. An electronic programmable system for controlling the operation of remotely located equipment comprising:

(a) first time base generating means including means for cyclically providing a plurality of output timing signals corresponding to a first predetermined number of equally spaced-apart points of a preselected first time base;

(b) controllable data transfer means including first data transfer means and second data transfer means;

(c) first programmable connection means including a plurality of controllable circuit paths operatively connected between said first time base generating means and said first data transfer means and a plurality of controllable circuit paths operatively connected between said first time base generating means and said second data transfer means, said programmable connection means including user-accessible panel means for receiving insertable program pins which effect actuation of selected ones of said controllable circuit paths thereby coupling selected ones of said output timing signals to said first data transfer means and to said second data transfer means;

(d) data transfer control means for selectively enabling said controllable data transfer means, said data transfer control means including means for generating a first data transfer control signal, a second data transfer control signal and a strobe signal, wherein said first data transfer control signal is coupled to said first data transfer means and said second data transfer control signal is coupled to said second data transfer means and said strobe signal is coupled to said first and second data transfer means, said first data transfer means being enabled when said first data transfer control signal, said strobe signal and one of said coupled output timing signals are coincidently applied to said first data transfer means, said second data transfer means being enabled when said second data transfer control signal, said strobe signal and one of said coupled output signals are coincidently applied to said second data transfer means;

(e) second time base generating means including means for cyclically providing a plurality of output control signals corresponding to a second predetermined number of equally spaced-apart points of a preselected second time base;

(f) programmable switching means operatively connected to said controllable data transfer means;

(g) second programmable connection means including a plurality of controllable circuit paths operatively connected between said second time base generating means and said programmable switching means, said second programmable connection means including user-accessible panel means for receiving insertable program pins which effect actuation of selected ones of said controllable circuit paths thereby coupling selected ones of said output control signals to said programmable switching means; and (h) said programmable switching means responsive to said transferred output timing signals and to said coupled control signals including means for generating a switching control signal for controlling the operation of said remotely located equipment.

4. An electronic programmable control system as recited in claim 3 wherein each of said plurality of controllable circuit paths associated with said first programmable connection means includes signal isolation means and each of said plurality of controllable circuit paths associated with said second programmable connection means includes signal isolation means.

5. An electronic programmable control system as recited in claim 4 wherein said isolation means include diode means.

6. An electronic programmable control system as recited in claim 5 including electronic display means responsive to said first time base generating means for providing a visual display of said first time base.

* * * * *